United States Patent [19]

Suzuki et al.

[11] 4,028,666
[45] June 7, 1977

[54] DATA TRANSFER SYSTEM

[75] Inventors: Masao Suzuki, Yokohama; Kunitoshi Moriya, Kawasaki, both of Japan

[73] Assignee: Fujitsu Ltd., Kawasaki, Japan

[22] Filed: Oct. 29, 1975

[21] Appl. No.: 626,642

[30] Foreign Application Priority Data

Oct. 31, 1974 Japan .............................. 49-126133

[52] U.S. Cl. ............................................ 340/172.5
[51] Int. Cl.² ........................................ G06F 7/00
[58] Field of Search ................................ 340/172.5

[56] References Cited
UNITED STATES PATENTS 3,755,788 8/1973 Finch ........................ 340/172.5
3,898,626 8/1975 Hutson et al. .............. 340/172.5

*Primary Examiner*—Gareth D. Shaw
*Assistant Examiner*—C. J. Bartz
*Attorney, Agent, or Firm*—Daniel Jay Tick

[57] ABSTRACT

A data transfer system receives incoming digital data serially at a predetermined bit rate and transfers such data serially at a different bit rate. A distributing device distributes the bits of incoming data into a plurality of groups. A delay device connected to the distributing device delays the bits of each group by predetermined delay times. An assembly device connected to the distributing device and the delay device assembles the delayed bits of each group into a group having a bit rate different from that of the incoming data.

8 Claims, 10 Drawing Figures

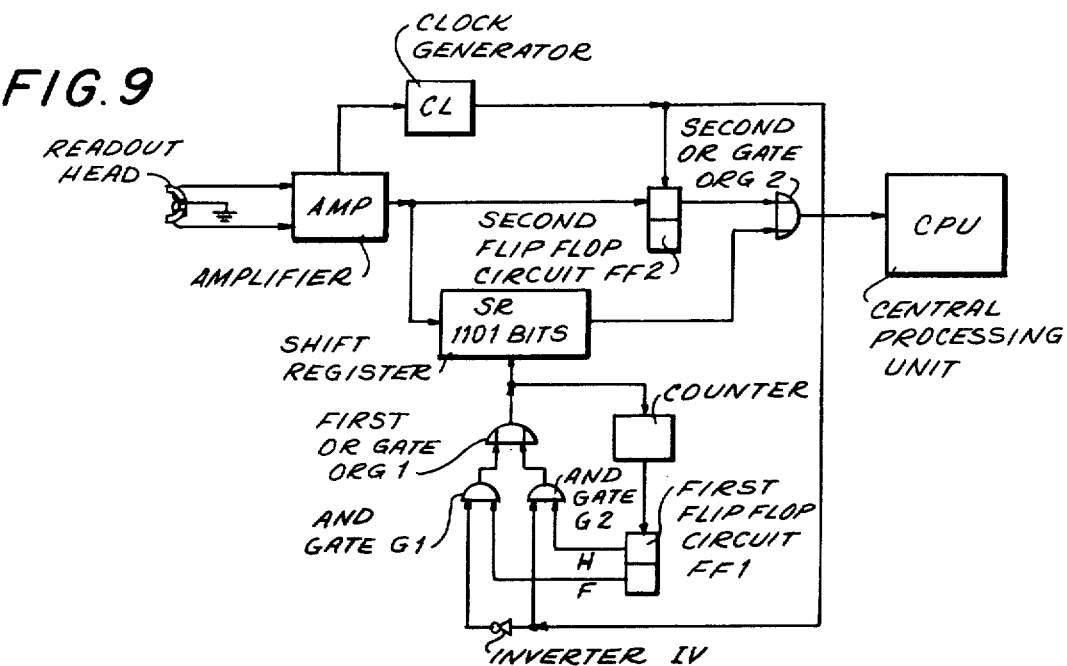
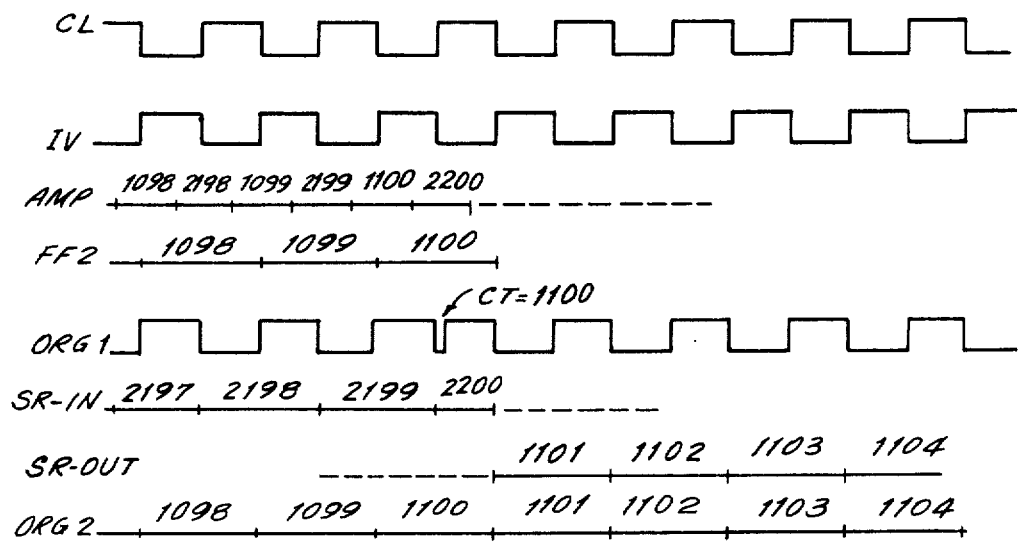

DATA TRANSFER SYSTEM

Background of the Invention

The present invention relates to a data transfer system.

A typical data transfer between the central processing unit, abbreviated as CPU, of a computer and a magnetic disc unit as an external auxiliary memory device involves a so-called input/output control unit that directly handles data with the magnetic disc unit. However, in the data transfer system of the present invention, it is supposed that the magnetic disc unit can directly handle data with the CPU in a manner whereby the function of the input/output control unit is included in the CPU.

An increase of memory capacity and high speed processing, including access speed, are prerequisite conditions for high performance of a computer system. This is also applicable to the magnetic disc unit which is used as an external auxiliary memory device. In order to increase the memory capacity of the magnetic disc unit, it is essential to increase the number of tracks in a plane of the disc and the information density in a track.

When the information density in a track is increased, the number of bits per unit length is increased. The number of revolutions of the disc must be decreased, or the writing and reading frequency of the head must be increased, in order to increase the memory capacity of the magnetic disc unit. However, it is not desirable to decrease the number of revolutions of the disc, because such a decrease may result in an increased access time. For this reason, it is preferable to increase the memory capacity by raising the writing and reading frequency.

Currently, the frequency or speed of writing and reading is as high as the processing speed in the CPU. On the other hand, the CPU is usually connected with input/output devices such as, for example, a card reader, line printer, magnetic tape unit, or the like, other than the magnetic disc unit. However, the processing speed of the input/output devices is in general considerably slower than that of the CPU. Therefore, by providing a buffer memory at the input/output control part of the CPU, data is handled in parallel on a time sharing basis for several input/output devices having different low processing times.

In case where a magnetic disc unit having an extremely high processing speed as compared with the input/output units is connected in a similar manner, the buffer memory of the input/output control part of the CPU is occupied by the magnetic disc unit and it becomes impossible for other input/output devices having a low processing to interrupt into such buffer memory. This condition will inevitably require another buffer memory for the high speed processing equipment in addition to the buffer memory of the low speed equipment.

The principal object of the invention is to provide a data transfer system of simple structure for greatly increasing the memory capacity of the magnetic disc unit.

An object of the invention is to provide a data transfer system of simple structure, which is inexpensive in manufacture, and functions efficiently, effectively and reliably to increase the memory capacity of the magnetic disc unit to a considerable extent.

Another object of the invention is to provide a data transfer system which continuously converts the processing speed, when considered from the low speed side, by using only one buffer memory and transferring part of the data from the low speed side, or to the low speed side, directly to the high speed side, and directing other data once to the buffer memory for storage and then to the high speed side, or the low speed side, at proper timing, during speed conversion.

BRIEF SUMMARY OF THE INVENTION

The data transfer system of the invention transfers data at a low speed, like the existing low speed unit, when considered from the standpoint of the CPU, and writes the data into and reads the data out from the magnetic disc unit at a high speed within the magnetic disc unit. This considerably increases the memory capacity of the magnetic disc unit.

The conversion of transfer speed is accomplished by once storing the data series in a group in the memory and then reading out the data at a speed different from the speed at which it is stored. The writing and reading are usually performed alternately by two memory units in order to continuously handle the data in the low speed unit. However, the data transfer system of the invention accomplishes this by using only one memory unit thereby providing efficient speed conversion.

The data transfer system of the invention converts bits sequences and bit intervals and continuously permits data processing at low speed for low processing speed equipment and permits data processing at high speed for high processing speed equipment. This is accomplished by direct transfer to a receiving point of part of digital data continuously successively transferred from a transmitting point when data is transferred between equipment having different processing speeds, and transfer of the remaining part of the digital data through a delay device such as, for example, a memory, a shift register or delay circuits.

In accordance with the invention, a data transfer system for receiving incoming digital data serially at a predetermined bit rate and transferring said data serially at a different bit rate, comprises distributing means for distributing the bits of incoming data into a plurality of groups. Delay means connected to the distributing means delay the bits of each group by predetermined delay times. Assembly means connected to the distributing means and the delay means assemble the delayed bits of each group into a group having a bit rate different from that of the incoming data.

In accordance with the invention, a data transfer system for receiving incoming digital data serially at a predetermined bit rate and transferring said data serially at a bit rate which is an integer times said predetermined bit rate, comprises distributing means for distributing the incoming data into a plurality of groups continuously, bit by bit. Delay means connected to the distributing means delay the bits of each group by predetermined delay times. Assembly means connected to the distributing means and the delay means assemble the bits of each group into a group wherein successive bits of one group are interposed between successive bits of another group whereby the bits of the different groups alternate thereby providing a bit rate which is an integer times said predetermined bit rate.

In accordance with the invention, a data transfer system for receiving incoming digital data serially at a predetermined bit rate and transferring said data serially at a bit rate which is one over an integer times said predetermined bit rate, comprises distributing means for distributing the incoming data into a plurality of groups sequentially bit by bit. Delay means connected to the distributing means delay the bits of each group by predetermined delay times. Assembly means connected to the distributing means and the delay means assemble the bits of each group sequentially in series thereby providing a bit rate which is one over an integer times said predetermined bit rate.

The delay means delays the bits of a specified group zero. The delay means may comprise a shift register.

In accordance with the invention, a data transfer system for receiving incoming digital data serially at a first predetermined bit rate, writing said incoming data on a revolving record medium at a bit rate which is an integer times said first predetermined bit rate, and trasferring data read out from the revolving record medium at a second predetermined bit rate at a bit rate which is an integer times said second predetermined bit rate, comprises a revolving record medium comprising a magnetic disc having a surface with a plurality of concentric circular areas and a plurality of sectors intersecting said circular areas to form sectoral areas. A write-in circuit has first distributing means for distributing the incoming data into a plurality of groups continuously, bit by bit, first delay means connected to the first distributing means for delaying the bits of each group by predetermined delay times, and first assembly means connected to the first distributing means and the first delay means for assembling the bits of each group into a first new group wherein successive bits of one group are interposed between successive bits of another group whereby the bits of the different groups alternate thereby providing a bit rate which is an integer times said first predetermined bit rate, and writing data of the first new group into a plurality of selected alternate sectoral areas of the surface of the disc. A readout circuit has second distributing means for distributing the incoming data into a plurality of groups sequentially bit by bit, second delay means connected to the second distributing means for delaying the bits of each group by predetermined delay times, and second assembly means connected to the second distributing means and the second delay means for assembling the bits of each group sequentially in series thereby providing a bit rate which is one over an integer times said first predetermined bit rate, and reading the sequential series data out from selected alternate sectoral areas of the surface of said disc.

BRIEF DESCRIPTION OF THE DRAWINGS

In order that the invention may be readily carried into effect, it will now be described with reference to the accompanying drawings, wherein:

FIG. 9 is a block diagram of another embodiment of the reading circuit of the data transfer system of the invention; and FIG. 10 is a time chart of the reading circuit of FIG. 9.

In the figures, the same components are identified by the same reference letters.

DETAILED DESCRIPTION OF THE INVENTION

For illustrative purposes, it is assumed, for example, that series data sent from the CPU at a transfer speed of 4M bits/sec is written into the magnetic disc unit at a speed of 8M bits/sec. It is also assumed that a buffer memory with a capacity of 1100 bits is provided in the magnetic disc unit and that the data continuously transferred from the CPU is divided into blocks of 1100 bits each.

In accordance with the present invention, the first single block of continuous data being transferred from the CPU is once stored in the buffer memory and is sent to the head by inserting each bit of said first block alternately, one by one, into the bits of the next block. The data is thus sent to the write-in head. At such time, each bit of the second block is supplied to the head directly from the CPU as the transfer data. This is the salient feature of the data transfer system of the present invention.

Figure 1:
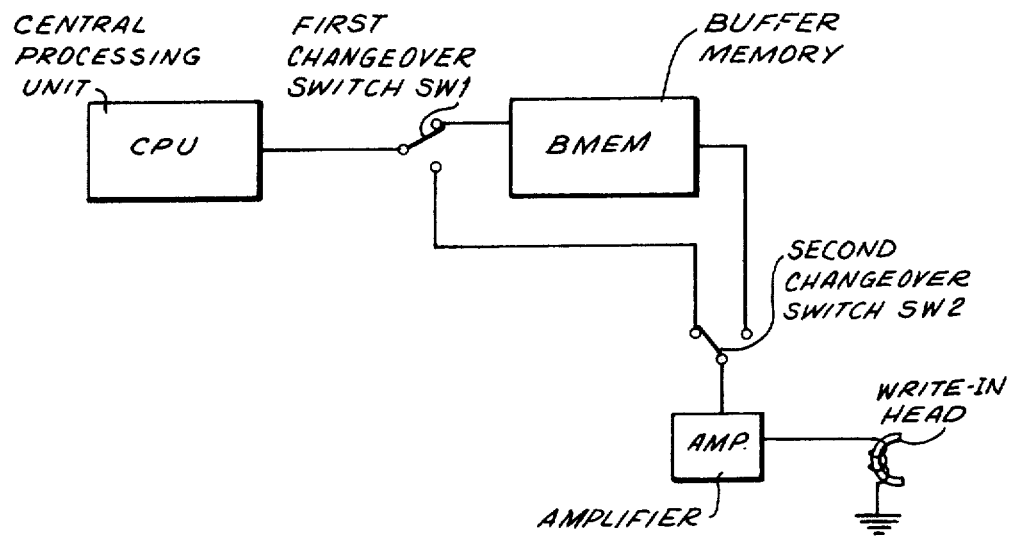
FIG. 1 is a block diagram for explaining the writing operation of the data transfer system of the invention.

FIG. 1 explains the writing or write-in operation of the data transfer system of the invention. In FIG. 1 the central processing unit CPU includes an input/output control unit. A first changeover switch SW1 is connected between the CPU and a buffer memory BMEM. A second changeover switch SW2 is connected between the first changeover switch SW1 and buffer memory and an amplifier AMP. A write-in head HEAD is connected to the second changeover switch SW2.

Figure 2:
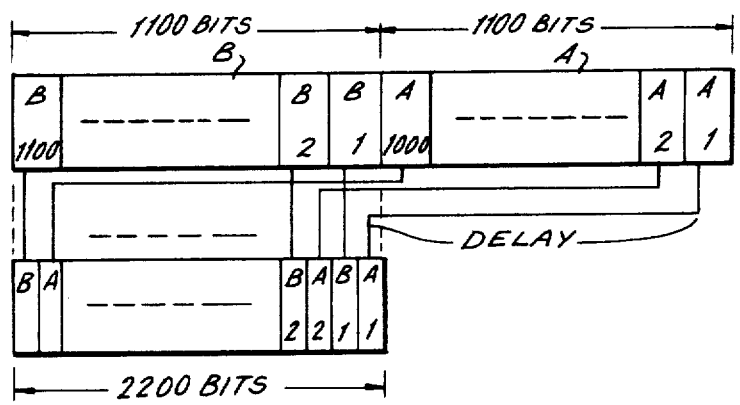
FIG. 2 is a schematic diagram for explaining the bit sequence of the data.

FIG. 2 explains the bit sequence conversion. The blocks A and B of FIG. 2 show the sequence of data to be transferred from the CPU. The first block A and the second block is B. The first block A includes 1100 bits of A1 to A1100 and the second block B includes 1100 bits of B1 to B1100.

The lowermost, or combined, block of FIG. 2 shows the bit sequence to be the output from the second changeover switch SW2 after the bit sequence conversion.

The bit interval in the blocks A and B is 250 nsec and that of the combined block is 125 nsec. This may be understood from the foregoing assumption that the transfer speed from the CPU is 4M bits/sec and the write-in speed into the disc is 8M bits/sec.

In FIG. 1, the first changeover switch SW1 is initially set to the BMEM side, as shown in FIG. 1, and therefore the buffer memory BMEM stores all of the data in the first block. At such time, the storage speed is, of course, 4M bits/sec.

When the buffer memory BMEM is filled with data, the first changeover switch SW1 is set to the SW2 side (not shown in FIG. 1) and thereby the heading bit B1 of the block B is led to the contact of the second changeover switch SW2. Simultaneously, the heading bit A1 of the block A, stored in the buffer memory BMEM, is provided as output from said buffer memory. When the switching period of the second changeover switch SW2 is assumed to be 125 nsec, and said switch is first set in the BMEM side, the bit A1 first appears as the output from said switch, and then the B1 bit appears from the first changeover switch SW1 after 125 nsec from the previous bit A1.

After another 125 nsec; that is, about 250 nsec after the input of the bit B1 to the switch SW2, the next bit B2 is supplied from the CPU to the switch SW2 via the switch SW1. Simultaneously, the bit A2 is provided as output from the buffer memory BMEM as in the aforedescribed case. At such time, the switch SW2 is again set to the BMEM side. Therefore, the bit A2 is the output of the switch SW2 and about 125 nsec thereafter, the bit B2 is supplied from the switch SW1.

In a manner similar to the aforedescribed manner, the output of the second changeover switch SW2 is subject to the bit sequence conversion as in the case of the combined block of FIG. 2, and the bit interval is shortened from 250 nsec to 125 nsec.

The bit sequence conversion is carried out for the third and fourth blocks in the same manner as that hereinbefore described.

Thus, two blocks are considered a unit of the conversion operation, as described. However, it is a problem only in the aforedescribed conversion operation in the data transfer. There is no need at all to consider the pause of data when considering it from the CPU. This is due to the fact that a part of the data from the CPU, which part is the block of even number, such as the second block B in the present example, is directly supplied as input to switch SW2 without passing the memory device. This is also a feature of the data transfer system of the present invention.

As a result of the aforedescribed speed conversion, the speed is doubled at the high speed side, which is at the write-in head HEAD. However, since the data becomes intermittent, some consideration is required for allocating the writing position on the magnetic disc unit.

As far as rotation of magnetic disc unit is concerned, it is impossible to stop the travelling or revolution of said magnetic disc unit for each block like that of tape travelling in a magnetic tape unit. It is therefore necessary to prepare some gap for the writing on the disc surface.

Figure 3:
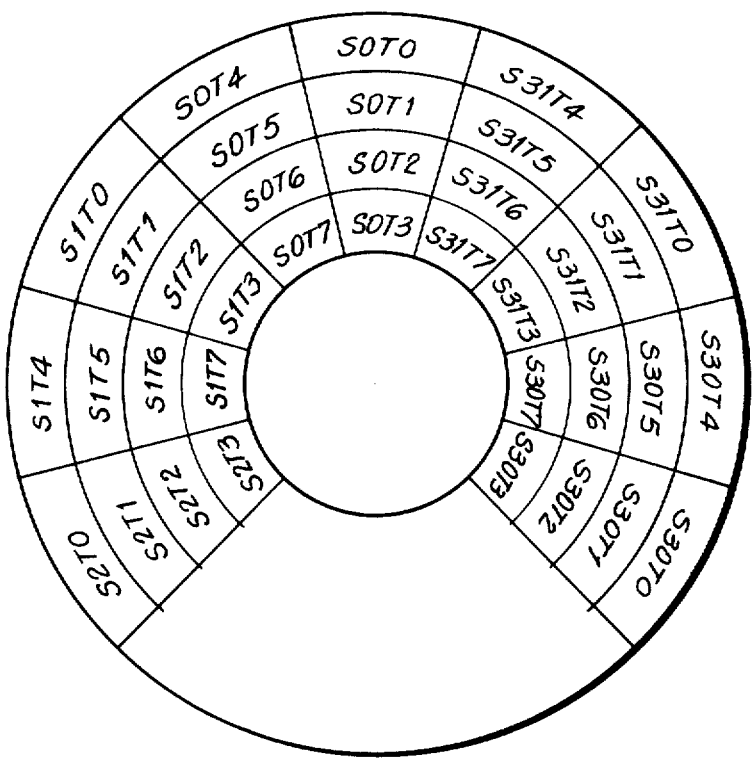
FIG. 3 is a schematic diagram illustrating the data format on the disc.

FIG. 3 shows an example of the assigning of the writing positions on the disc surface, called a data format. The disc surface is divided into a total of 64 sectors partitioned in equal space and simultaneously divided into four concentric tracks. There are, of course, actually several hundred tracks on the surface of the disc.

In FIG. 3, each domain, called the small sector, assigned by the sector and track is identified by proper number. The sectors are divided into 32 parts from S0 to S31 with a pair of sectors. In addition, track numbers T0 to T3 and T4 to T7 are provided from the outermost side within each sector with a pair of sectors. Since the drawing of all 64 sectors would complicate the presentation of FIG. 3, said figure shows only some of the sectors, in order to maintain the clarity of illustration.

When the data format is provided as shown and a capacity of 2200 bits to a small sector is provided for the memory, writing and reading can be made very efficiently. Practically, the number of sectors is determined so that one small sector may have a memory capacity of 2200 bits.

In a data format of the type illustrated, writing on the small sectors may be accomplished continuously in the following sequence.

$$S0T0 - S1T0 - S2T0 \ldots S30T0 - S31T0$$

The foregoing cycle corresponds to one track of a magnetic disc unit having ordinary processing speed.

Writing is then accomplished for the second track in the following sequence.

$$S0T1 - S1T1 - S2T1 \ldots S30T1 - S31T1$$

Similarly, writing is accomplished or performed in succession for the third and fourth tracks; that is, for the sectors S0T2 to S31T2 and S0T3 to S31T3. Furthermore, writing is accomplished for the sectors S0T4 to S31T4. This corresponds to the first track of the second disc in a magnetic disc unit having ordinary processing speed.

In the aforedescribed manner, writing is accomplished for the sectors S0T5 to S31T5, S0T6 to S31T6, and S0T7 to S31T7, in succession.

In other words, writing is carried out at a speed double the usual one, since in the embodiment, a sheet or plane of the disc can store the data with doubled capacity, as compared with a disc unit of ordinary processing speed. Furthermore, it may be supposed that the number of tracks in a sheet or plane of a disc is doubled.

The readout operation of data written after the bit sequence conversion is now explained. The readout operation is also accomplished in a unit of one sector, wherein two blocks equal 2200 bits.

Of the data being read out sequentially at a speed of 8M bits/sec, the odd numbered bits are directly provided as output. However, the even numbered bits are once stored in the buffer memory. When the last odd numbered bit, which is the 2199th bit, is directly provided as output, and the last even numbered bit, which is the 2200th bit, is stored in the buffer memory in succession, the even numbered bits stored as hereinbefore mentioned are fed out at a speed of 4M bits/sec.

Figure 4:
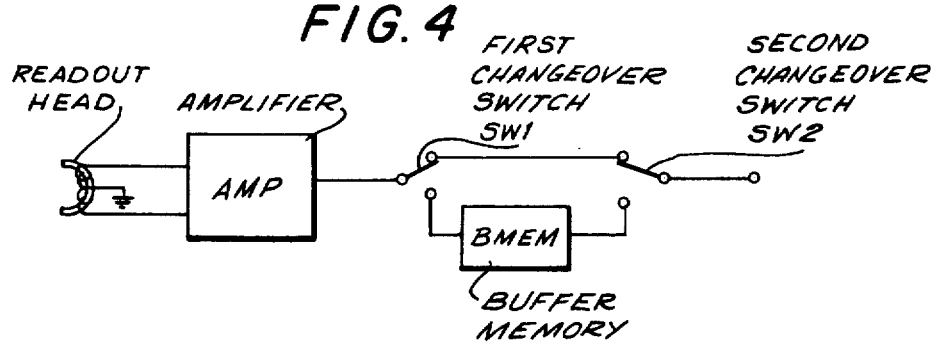
FIG. 4 is a block diagram for explaining the reading operation of the data transfer system of the invention.

FIG. 4 explains the reading or readout operation. In FIG. 4, a first changeover switch SW1 is coupled to a readout head HEAD via an amplifier AMP. A buffer memory BMEM is connected to the first changeover switch SW1 and a second changeover switch SW2 is connected to said buffer memory and to said first changeover switch.

The switch SW1 performs the switching operation each time a bit is read out from the readout head HEAD. That is, the odd numbered bits are directly supplied to the switch SW2, while the even numbered bits are supplied to the buffer memory.

At first, the switch SW2 is closed to the side of the switch SW1. When the data of one sector is distributed by the switch SW1 and the last even numbered bit is fed to the buffer memory BMEM, the even numbered bits are read out for every 250 nsec, which is a speed of 4M bits/sec, in the same sequence as storing from the buffer memory after 125 nsec, and are supplied to the switch SW2. At such time, the switch SW2 is switched to the BMEM side. As a result, if the small sector is read out with the data format shown in the combined block of FIG. 2, the output of the switch SW2 is converted to the conversion shown in blocks A and B of FIG. 2.

In aforedescribed embodiment, writing into the disc and reading out from the disc are performed at a double the transfer speed from the CPU. It is generally possible to provide n times the speed, however.

Figure 5:
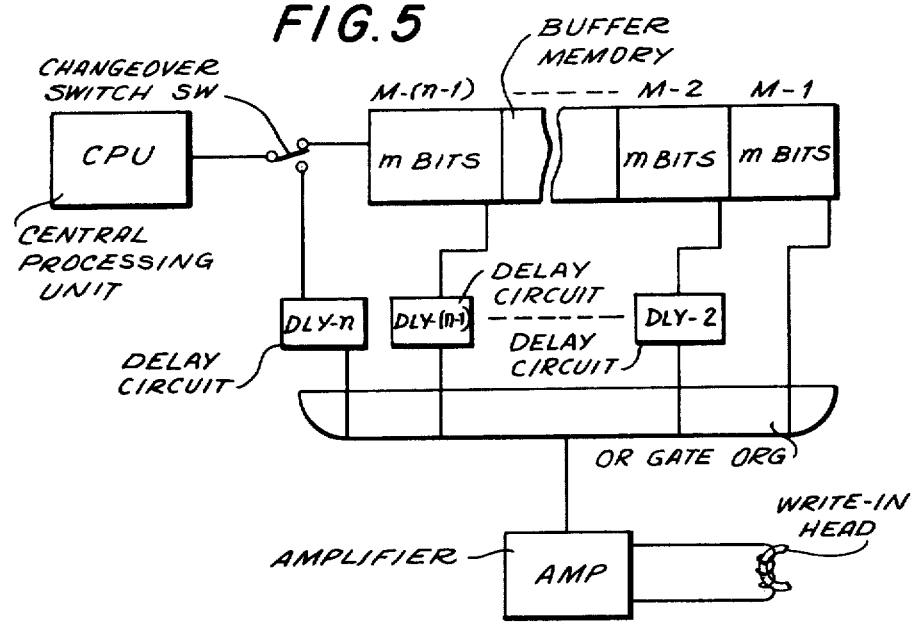
FIG. 5 is a block diagram of an embodiment of the writing circuit of the data transfer system of the invention for providing $n$ times writing speed.

FIG. 5 is a block diagram of an embodiment of the writing or write-in circuit of the data transfer system of the invention for providing n times writing speed. In FIG. 5, a central processing unit CPU is connected to a buffer memory M−1 to M − (n − 1) via a changeover switch SW. The CPU is connected to a delay circuit DLY-n of delay circuits DLY - 2 to DLY - n via the switch SW. The remaining delay circuits are connected to the buffer memory. All the delay circuits are coupled to an amplifier AMP via an OR gate ORG. A write-in head HEAD is connected to the amplifier AMP.

In the circuit of FIG. 5, the data is supposed to appear in the form of pulses at the center of each bit frame, as shown in FIG. 2. For this reason, the OR gate ORG replaces the second changeover switch SW2 of FIGS. 1 and 4.

When the memory capacity of each buffer memory is assumed as $m$ bits, the unit of speed conversion operation, which is two blocks equals 2200 bits in the aforementioned example, is $n \times m$ bits.

The operation of the circuit of FIG. 5 is as follows. The first $m \times (n - 1)$ bits among the data of $n \times m$ bits applied from the CPU at a specified speed such as, for example C bits/sec, are once stored in the buffer memory M −1 to M − (n − 1). The switch SW is successively changed over to the delay circuit DLY - n side from the $1 \times (n − 1) + $ 1th bit. Simultaneously, data is supplied to the corresponding delay circuit after it has been read out bit by bit from the buffer memory M−1 to M − (n − 1). The second bit is read out from the M − 1, m + 1th bit, from the M − 2, 2m + 1th bit, from the M − 3, and so on, in the same way, $m \times (n − 2) + $ 1th bit from 1 − (n − 1), respectively.

At such time, the delay time of each delay circuit is $1/nC$ sec for the circuit DLY - 2, $2/nC$ sec for the circuit DLY - 3, and, similarly, $n-1/nC$ sec for the circuit DLY - n. As a result, as far as the output of the OR gate ORG is concerned, the bit period becomes $1/nC$ sec. Thus, the speed becomes $nC$ bits/sec.

Figure 6:
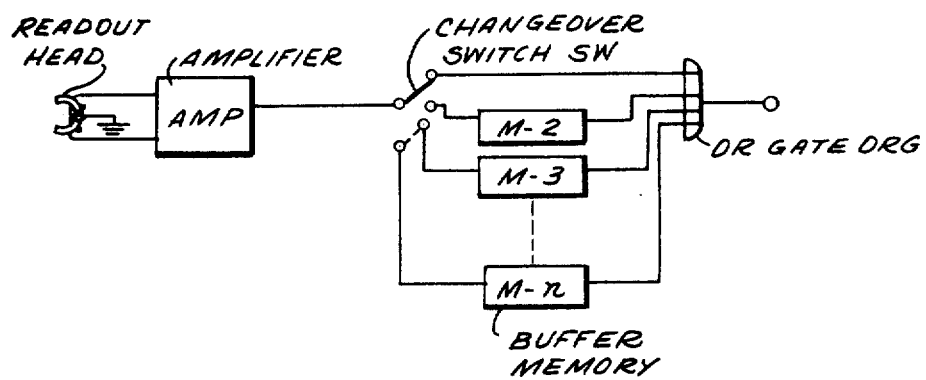
FIG. 6 is a block diagram of an embodiment of the reading circuit of the data transfer system of the invention.

FIG. 6 is a block diagram of an embodiment of the reading or readout circuit of the data transfer system of the invention. In FIG. 6, a changeover switch SW is coupled to a readout head HEAD via an amplifier AMP. A buffer memory M −2 to M −n is connected to the switch SW. An OR gate ORG is connected to the switch SW and to the buffer memory.

The first bit of the data supplied from the readout head HEAD at a speed of $nC$ bits/sec is transferred directly to the OR gate ORG and the second bit is transferred to the buffer memory M − 2. Similarly, the nth bit is supplied to the memory M − n. Data is distributed by the switch SW. Thus, the n + 1th bit is supplied to the OR gate and the n + 2th bit is supplied to the buffer memory M − 2.

The data is read out, bit by bit, from the buffer memory M − 2 at an interval of $1/C$ sec, about $1/nC$ sec after the $m \times n$th bit is stored in the memory M − n and fed to the OR gate ORG. When all the data of the buffer memory M − 2 is read out, reading or readout is further continued for the buffer memory M − 3, M − 4, . . . in succession at an interval of $1/C$ sec. Thus, the bit interval of the output of the OR gate ORG is converted to $1/C$ sec. The speed in converted to C bits/sec.

On the other hand, the data format of the disc is prepared in essentially the same manner as in the foregoing example. It is necessary that the sectors of integers times n be prepared and that the sequence of small sectors on a track be determined in every other $(n − 1)$ sector.

Figure 7:
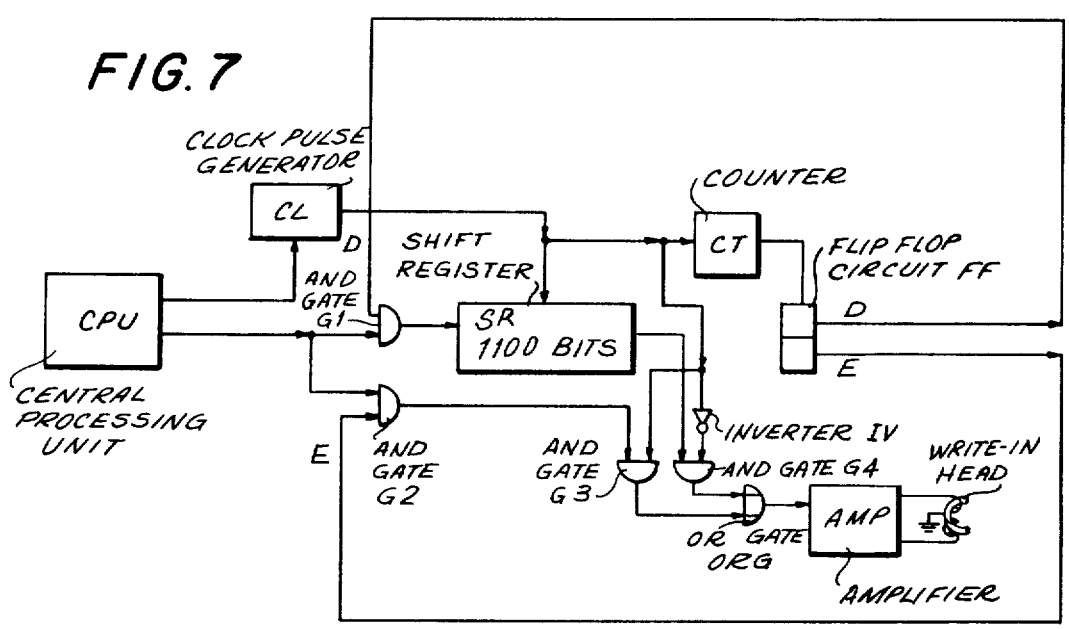
FIG. 7 is a block diagram of another embodiment of the writing circuit of the data transfer system of the invention.

FIG. 7 is a block diagram of another embodiment of the writing circuit of the data transfer system of the invention. The following explanation of the operation of FIG. 7 is a more specific explanation of the operation of FIG. 1. In FIG. 7, a clock pulse generator CL, which generates clock pulses at 4 MHz in synchronization with the CPU, has an input connected to the CPU and an output connected to an input of a shift register SR of 1100 bits, used as the buffer memory, the input of a counter CT and a first input of each of an AND gate G3 and an AND gate G4 via an inverter IV. The CPU is connected to a first input of each of a pair of AND gates G1 and G2. The output of the AND gate G1 is connected to another input of the shift register SR. The counter CT counts 1100 and counts the number of clock pulses. When the counter CT counts up to 1100, it produces an output pulse, which clears the count to 0.

The output of the AND gate G2 is connected to the second input of the AND gate G3. The output of the shift register SR is connected to the second input of the AND gate G4. The outputs of the AND gates G3 and G4 are coupled to an amplifier AMP via an OR gate ORG. A write-in head HEAD is converted to the output of the amplifier AMP. A flip flop circuit FF has an input connected to the output of the counter CT, an output D connected to the second input of the AND gate G1 and an output E connected to the second input of the AND gate G2.

The flip flop FF inverts the output D, E each time a pulse is supplied from the counter CT, and switches the AND gates G1 and G2. The AND gates G3 and G4 operate alternately, in accordance with the clock pulses.

Figure 8:
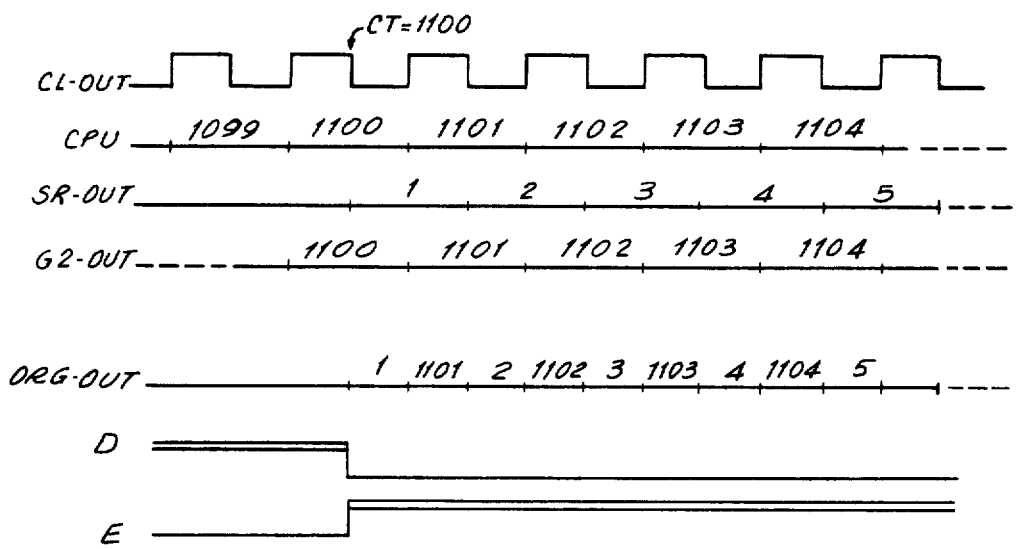
FIG. 8 is a time chart of the writing circuit of FIG. 7.

FIG. 8 is a time chart. The numbers in FIG. 8 represent the sequence of bits supplied from the CPU. It is initially assumed that the output D of the flip flop FF is 1 and that the output E of said flip flop is 0 and the initial count of the counter CT is 0. The first 1100 bits of the data transferred from the CPU is stored in the shift register SR by being shifted sequentially from the left to the right.

It is also assumed that the sampling and shift operation of the input of the shift register SR are triggered by the falling edge of the clock pulse. When the 1100th is sampled and stored at the extreme left bit of the shift register SR, the initially stored bit, which is the first bit, appears at the extreme right bit of said shift register.

Simultaneously, since the counter CT counts the 1100th clock and produces an output pulse, the flip flop FF inverts its output, opening the AND gate G2. At such time, therefore, the latter half of the 1100th bit appears as the output of the AND gate G2. However, since the clock data entering the AND gate G3 is 0, said gate is closing, while the AND gate G4 is opening. One bit of the shift register SR appears as the output of the OR gate ORG.

The bit train appears, at double speed, at the OR gate ORG, due to the successive alternate opening and closing of the AND gates G4 and G3.

FIG. 9 is a block diagram of another embodiment of the reading or readout circuit of the data transfer system of the invention. In FIG. 9, a readout head HEAD is connected to the input of an amplifier AMP. An output of the amplifier is connected to the input of a clock generator CL which generates clock pulses at 4MHz in synchronization with the readout signals. Another output of the amplifier is connected to an input of a shift register SR of 1101 bits and to an input of a second flip flop circuit FF2. The output of the clock generator CL is connected to an input of the second flip flop circuit FF2, to a first input of an AND gate G1 via an inverter IV and to a first input of an AND gate G2.

The outputs of the AND gates G1 and G2 are connected to the inputs of first OR gate ORG1. The output of the first OR gate ORG1 is connected to another input of the shift register SR and to the input of a counter CT. The counter CT counts up to 1100. The output of the counter CT is connected to the input of a first flip flop circuit FF1. The first flip flop circuit FF1 has an output F connected to a second input of the AND gate G1 and an output H connected to a second input of the AND gate G2.

The output of the shift register SR and the output of the second flip flop circuit FF2 are connected to inputs of a second OR gate ORG2. The output of the second OR gate ORG2 is connected to the central processing unit CPU.

The first flip flop circuit FF1 functions to change the phase of the clock signals supplied to the shift register SR. The second flip flop circuit FF2 functions as a sample hold.

It is assumed that the output F of the first flip flop circuit FF1 is initially 1 and that the output H of said flip flop circuit is initially 0. The clock pulses are therefore supplied to the shift register SR and to the second flip flop circuit FF2 in inverse or opposite phases. As a result, the data output from the amplifier AMP is sampled alternately at the shift register SR and at the second flip flop circuit FF2 in every other data. Thereby, the bits from the first bit to the 1100th bit appear at the output of the second flip flop circuit FF2 at an interval of 250 nsec. In addition, when sampling at the shift register SR is repeated 1100 times, the counter CT produces an output pulse which cause the first flip flop circuit FF1 to reverse. The clock pulse to the shift register SR thus has an inverse or opposite phase.

At such time, the capacity of the shift register SR is made 1101 bits in order to prepare the delay time of 125 nsec to the output of said shift register.

In aforedescribed embodiment, the shift register SR is used as the buffer memory. However, any suitable circuit having a memory function or a delay function may be used.

The writing and reading circuits may be used in common with each other, but when they are provided individually, the writing and reading may be accomplished simultaneously with the same head by considering it from the standpoint of the CPU.

As hereinbefore mentioned, the data transfer system of the invention is capable of converting the processing speed continuously when considered from the low speed side, with use of only one buffer memory, by transferring a part of the data from the low speed side, or to the low speed side, directly to the high speed side, and directing other data, once to the buffer memory for storage and then to the high speed side, or to the low speed side, at proper timing, while performing the speed conversion.

While the invention has been described by means of specific examples and in specific embodiments, we do not wish to be limited thereto, for obvious modifications will occur to those skilled in the art without departing from the spirit and scope of the invention.

We claim:

1. A data transfer system for receiving incoming digital data serially at a predetermined bit rate and transferring said data serially at a different bit rate, said data transfer system comprising
   distributing means for distributing the bits of incoming data into a plurality of groups;
   delay means connected to the distributing means for delaying the bits of each group by predetermined delay times;
   assembly means connected to the distributing means and the delay means for assembling the delayed bits of each group into a group having a bit rate different from that of the incoming data; and
   an output coupled to the assembly means.

2. A data transfer system for receiving incoming digital data serially at a predetermined bit rate and transferring said data serially at a bit rate which is an integer times said predetermined bit rate, said data transfer system comprising
   distributing means for distributing the incoming data into a plurality of groups continuously, bit by bit;
   delay means connected to the distributing means for delaying the bits of each group by predetermined delay times;
   assembly means connected to the distributing means and the delay means for assembling the bits of each group into a group wherein successive bits of one group are interposed between successive bits of another group whereby the bits of the different groups alternate thereby providing a bit rate which is an integer times said predetermined bit rate; and
   an output coupled to the assembly means.

3. A data transfer system for receiving incoming digital data serially at a predetermined bit rate and transferring said data serially at a bit rate which is one over an integer times said predetermined bit rate, said data transfer system comprising
   distributing means for distributing the incoming data into a plurality of groups sequentially bit by bit;
   delay means connected to the distributing means for delaying the bits of each group by predetermined delay times;
   assembly means connected to the distributing means and the delay means for assembling the bits of each group sequentially in series thereby providing a bit rate which is one over an integer times said predetermined bit rate; and
   an output coupled to the assembly means.

4. A data transfer system as claimed in claim 2, wherein the delay means provides zero delay for the bits of a specified group.

5. A data transfer system as claimed in claim 2, wherein the delay means comprises a shift register.

6. A data transfer system as claimed in claim 3, wherein the delay means provides zero delay for the bits of a specified group.

7. A data transfer system as claimed in claim 3, wherein the delay means comprises a shift register.

8. A data transfer system for receiving incoming digital data serially at a first predetermined bit rate, writing said incoming data on a revolving record medium at a bit rate which is an integer times said first predetermined bit rate, and transferring data read out from the revolving record medium at a second predetermined bit rate at a bit rate different from said second predetermined bit rate, said data transfer system comprising

- a revolving record medium comprising a magnetic disc having a surface with plurality of concentric circular areas and a plurality of sectors intersecting said circular areas to form sectoral areas;
- a write-in circuit having first distributing means for distributing the incoming data into a plurality of groups continuously, bit by bit, first delay means connected to the first distributing means for delaying the bits of each group by predetermined delay times, and first assembly means connected to the first distributing means and the first delay means for assembling the bits of each group into a first new group wherein successive bits of one group are interposed between successive bits of another group whereby the bits of the different groups alternate thereby providing a bit rate which is an integer times said first predetermined bit rate, writing means coupled to the first assembly means and said revolving record means for writing the data of the first new group into a plurality of selected alternate sectoral areas of the surface of said disc; and
- a readout circuit having second distributing means for distributing data into a plurality of groups sequentially bit by bit, second delay means connected to the second distributing means for delaying the bits of each group by predetermined delay times, second assembly means connected to the second distributing means and the second delay means for assembling the bits of each group sequentially in series thereby providing a bit rate which is one over an integer times said first predetermined bit rate, readout means in operative proximity with the disc and coupled to the second distributing means for reading the sequential series data out from selected alternate sectoral areas of the surface of said disc, and an output coupled to the second assembly means.

* * * * *